April 6, 1926.
Re. 16,308
D. A. EBINGER
WASHBASIN
Original Filed Feb. 11, 1924
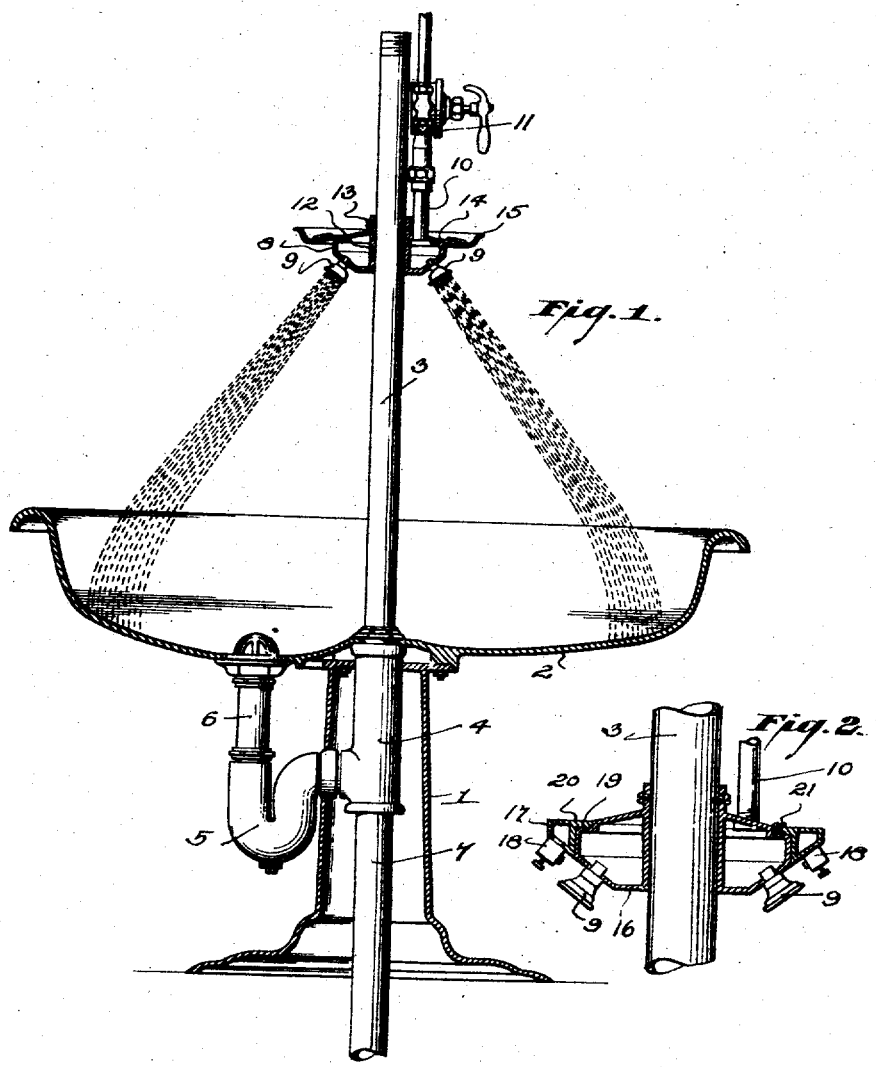
Inventor
David A. Ebinger
By W. S. McDowell.
Attorney Reissued Apr. 6, 1926. Re. 16,308

UNITED STATES PATENT OFFICE.

DAVID A. EBINGER, OF COLUMBUS, OHIO, ASSIGNOR TO THE D. A. EBINGER SANITARY MANUFACTURING COMPANY, OF COLUMBUS, OHIO, A CORPORATION OF OHIO.

WASHBASIN.

Original No. 1,517,414, dated December 2, 1924, Serial No. 691,908, filed February 11, 1924. Application for reissue filed November 16, 1925. Serial No. 69,547.

*To all whom it may concern:*

Be it known that I, DAVID A. EBINGER, a citizen of the United States, residing at Columbus, in the county of Franklin and State of Ohio, have invented a new and useful Improvement in Washbasins, of which the following is a specification.

The present invention is directed to improvements in wash basins.

The primary object of the invention is to provide a basin so constructed that a number of persons can congregate therearound to wash their face and hands, the construction being particularly desirable for use in factories or places where a number of persons may wash at the same basin and in a strictly sanitary manner.

A further object of the invention is to provide a basin wherein a plurality of rose nozzles are employed for discharging water in a downward direction to enable each person to wash in a separate column of finely sprayed water.

A still further object of the invention is to provide a novel means for mounting the soap container either in cake or liquid form in a position convenient for each person.

With these and other objects in view, as will appear as the description proceeds, the invention consists in the novel features of construction, combinations of elements and arrangements of parts, and hereinafter to be fully described and pointed out in the appended claims.

In the accompanying drawing:

Figure 1 is a vertical sectional view through the device,

Figure 2 is a detail sectional view showing the manifold equipped with a soap receptacle.

Referring to the drawing 1 designates a hollow metallic pedestal upon which is mounted the basin 2, said basin being formed from enamel ware and is circular in form. Rising centrally from the basin 2 is a vent pipe 3, the lower end of which is engaged in a coupling 4 which extends into the base 1 and has associated therewith the usual trap 5, said trap being in communication with the interior of the basin 2 through the medium of the drain connection 6, there being a pipe section 7 which is connected with the member 4 to conduct waste water from the basin to a sewer system.

Mounted upon the vent pipe 3 is an annular manifold 8, said manifold having associated therewith a plurality of circularly aligned rose nozzles 9, the same being arranged at an angle to direct the streams of water downwardly and into the basin as shown clearly in Figure 1 of the drawing. Connected with the manifold 8 is a pipe 10 which is connected with the water service pipes and has associated therewith a compound valve 11 so that hot and cold water can be mixed previous to entering the manifold 8. The manifold 8 has a central sleeve 12 for receiving the vent pipe 3, said sleeve being provided with a set screw 13 to enable the manifold to be held in adjustable positions upon the vent pipe.

This manifold is provided with an annular shoulder 14 upon which is engaged the inner periphery of the circular soap container 15, this container being for the purpose of receiving soap in cake form.

In Figure 2 the manifold 16 has connected therewith an annular receptacle 17, said receptacle being provided with a plurality of valves 18 which are constructed in such manner that liquid soap contained in the receptacle 17 may be discharged from the valves in measured quantities, or as needed. In order to prevent the receptacle 17 from sliding downwardly upon a manifold 16 said manifold is provided with a shoulder 19 upon which the rim 20 of the receptacle rests, there being bolts 21 to securely connect the receptacle 2 of the manifold. It will be observed that owing to the fact that the manifold is secured or supported upon the vent pipe 3 that the rose nozzles will be so located that a person can place the head directly in the streams of water ejected from said nozzles without the likelihood of striking the head upon the nozzles as now frequently occurs with wash basins of the well known construction. It will be of course apparent that the rose nozzles, if desired may each be provided with valves so that the nozzle being used will be the only one discharging water.

From the foregoing description it will be seen that I have provided a wash basin which is extremely sanitary and one in which a number of persons can conveniently perform their ablutions, the construction being such that the device will occupy a minimum amount of space.

What is claimed is:

1. A device of the class described comprising a basin, a vent pipe rising centrally therefrom, a manifold adjustably carried by the vent pipe and having a soap container associated therewith, and means for introducing water into the manifold.

2. A device of the class described comprising a basin, a vent pipe rising centrally therefrom, a manifold including a sleeve, said sleeve being adjustably connected to the vent pipe, a plurality of nozzles associated with the manifold, means for conducting water to the manifold for ejection through said nozzle.

3. A device of the class described comprising a pedestal, a basin supported upon the pedestal, a vent pipe rising centrally from the basin and having a manifold adjustably mounted thereon, nozzles carried by the manifold for directing water therefrom downwardly into the basin, means for introducing water into the manifold, said manifold having an annular shoulder, and a soap container associated with the manifold and supported by the annular shoulder.

4. A multiple wash stand structure comprising a basin, a water outlet connection leading from said basin, a vent pipe arising vertically and axially from said basin and having the lower end thereof in communication with said outlet connection, a manifold mounted on said vent pipe above said basin, a source of water supply in communication with said manifold, and a plurality of nozzles formed with said manifold and situated to direct a plurality of separate jets of water downwardly and outwardly from said manifold into the basin.

5. A multiple wash stand structure comprising a basin, a water outlet connection leading from said basin, a vent pipe arising vertically and axially from said basin and having the lower end thereof in communication with said outlet connection, a manifold arranged concentrically with said vent pipe and disposed above said basin, said manifold being provided with a plurality of outlets arranged to direct a plurality of downwardly and outwardly issuing water streams into said basin, and a source of water supply in communication with said manifold.

6. A lavatory appliance of the character set forth comprising a basin, a water outlet connection leading from said basin, a vertically extending vent pipe projecting upwardly from said basin and in communication at its lower end with said outlet connection, and appliances arranged above said basin and grouped around said vent pipe to direct a plurality of downwardly and outwardly issuing water streams from said appliances into said basin.

7. A lavatory appliance of the character set forth comprising a basin, a water outlet connection leading from said basin, a support arising axially and vertically with respect to said basin, said support including a vent conduit, and a manifold mounted on said support above said basin and constructed to direct a plurality of downwardly and outwardly flowing streams of water from said manifold into said basin.

DAVID A. EBINGER.